(12) United States Patent
Christian et al.

(10) Patent No.: US 9,428,401 B1
(45) Date of Patent: Aug. 30, 2016

(54) SEPARATION OF THE RARE-EARTH FISSION PRODUCT POISONS FROM SPENT NUCLEAR FUEL

(71) Applicants: Jerry D. Christian, Idaho Falls, ID (US); James W. Sterbentz, Idaho Falls, ID (US)

(72) Inventors: Jerry D. Christian, Idaho Falls, ID (US); James W. Sterbentz, Idaho Falls, ID (US)

(73) Assignee: U.S. Department of Energy, Washington, DC (US)

( * ) Notice: Subject to any disclaimer, the term of this patent is extended or adjusted under 35 U.S.C. 154(b) by 793 days.

(21) Appl. No.: 13/622,034

(22) Filed: Sep. 18, 2012

(51) Int. Cl.
*G21G 1/06* (2006.01)
*C01G 43/025* (2006.01)
*G21C 3/62* (2006.01)
*G21G 1/00* (2006.01)

(52) U.S. Cl.
CPC ............. *C01G 43/025* (2013.01); *G21C 3/623* (2013.01); *G21G 1/001* (2013.01)

(58) Field of Classification Search
CPC ............ G21G 1/001; G21G 1/04; G21G 2001/0094; G21F 9/007
See application file for complete search history.

(56) References Cited

U.S. PATENT DOCUMENTS

2009/0162278 A1\* 6/2009 Ravn ...................... G21G 1/001
424/1.37

\* cited by examiner

*Primary Examiner* — Jack W Keith
*Assistant Examiner* — Marshall O'Connor
(74) *Attorney, Agent, or Firm* — Felisa L. Leisinger; Michael J. Dobbs; John T. Lucas (57) ABSTRACT

A method for the separation of the rare-earth fission product poisons comprising providing a spent nuclear fuel. The spent nuclear fuel comprises $UO_2$ and rare-earth oxides, preferably Sm, Gd, Nd, Eu oxides, with other elements depending on the fuel composition. Preferably, the provided nuclear fuel is a powder, preferably formed by crushing the nuclear fuel or using one or more oxidation-reduction cycles. A compound comprising Th or Zr, preferably metal, is provided. The provided nuclear fuel is mixed with the Th or Zr, thereby creating a mixture. The mixture is then heated to a temperature sufficient to reduce the $UO_2$ in the nuclear fuel, preferably to at least to 850° C. for Th and up to 600° C. for Zr. Rare-earth metals are then extracted to form the heated mixture thereby producing a treated nuclear fuel. The treated nuclear fuel comprises the provided nuclear fuel having a significant reduction in rare-earths.

19 Claims, 3 Drawing Sheets

SEPARATION OF THE RARE-EARTH FISSION PRODUCT POISONS FROM SPENT NUCLEAR FUEL

GOVERNMENT INTERESTS

The United States Government has rights in this invention pursuant to Contract No. DE-AC07-05ID14517, between the U.S. Department of Energy (DOE) and the Battelle Energy Alliance.

FIELD OF THE INVENTION

The present invention relates to the dry recycling of spent nuclear fuel.

BACKGROUND OF THE INVENTION

Commercial nuclear reactors are capable of producing energy with no significant emissions into the atmosphere. However, nuclear reactors generate radioactive spent nuclear fuel (SNF), which following power generation are no longer capable of sustaining a fission chain reaction due to a build-up of neutron-absorbing fission products called poisons. For re-introduction back in the reactor for further power generation, spent fuel must be recycled by separating the remaining uranium fuel from the neutron-absorbing fission products. Recycling can maximize nuclear fuel utilization and reduce waste.

Various techniques can be used to recycle spent nuclear fuel. PUREX (Plutonium-Uranium-Extraction) is an accepted standard aqueous (wet) reprocessing method for the recovery of fissile uranium and plutonium from nuclear fuel. PUREX is based on dissolving the fuel in acid and utilizing liquid-liquid extraction to separate the uranium and plutonium from fission products. Pyroprocessing is another recycling technique whereby a high-temperature molten salt, for example LiCl+KCl, is used as an electrolyte in an electrochemical extraction of uranium and plutonium. Some efforts have been done to recycle spent nuclear fuel using a dry recycle process, for example the process described in U.S. Pat. No. 5,597,538. Concerns about the possibility of extracting plutonium, the use of toxic chemicals, and the large volumes of radioactive liquid and gaseous waste associated with these recycle methods has led to an alternative method known as dry recycling which avoids these negative features. Dry recycling does not extract plutonium or use toxic chemical additives or generate large volumes of radioactive liquids. Generally, dry recycling only requires fresh enriched uranium oxide feed material (20-30% volume and 17 wt % enriched uranium oxide) to be mixed with the existing spent fuel in order to overcome effects of residual neutron absorbing fission products, primarily rare-earths. The fresh feed+spent fuel mixture is a viable nuclear fuel for further power generation. The fresh feed requirements can however be significantly reduced by the removal of the neutron absorbing fission products. Therefore there is a need for the extraction of the rare-earth fission product poisons and consequently a significant reduction in the fresh feed volume fraction and enrichment resulting in enhanced economic viability as well proliferation and environmental attractiveness.

SUMMARY OF THE INVENTION

A method for the separation of the rare-earth fission product poisons from a spent nuclear fuel. The spent nuclear fuel comprises $UO_2$ and rare-earth oxides, preferably Sm, Gd, Nd, Eu oxides, with other elements depending on the fuel composition. Preferably, the provided nuclear fuel is a powder, preferably formed by crushing the nuclear fuel or using one or more oxidation-reduction cycles. An element or compound comprising thorium (Th) or zirconium (Zr) is provided. The provided nuclear fuel is mixed with the Th or Zr, thereby creating a mixture. The mixture is then heated to a temperature sufficient to reduce at least some of the $UO_2$ in the nuclear fuel, preferably to at least to 850° C. for Th and up to 600° C. for Zr. Rare-earth metals or oxides, preferably Sm, Gd, Nd, Eu, are then extracted to form the heated mixture thereby producing a treated nuclear fuel. The treated nuclear fuel comprises the provided nuclear fuel having a significant reduction in rare-earth metals.

DETAILED DESCRIPTION OF THE INVENTION

A method for the separation of the rare-earth fission product poisons from a spent nuclear fuel. The spent nuclear fuel comprises $UO_2$ and rare-earth oxides, preferably Sm, Gd, Nd, Eu oxides, with other elements depending on the fuel composition. Preferably, the provided nuclear fuel is a powder, preferably formed by crushing the nuclear fuel or using one or more oxidation-reduction cycles. An element or compound comprising Thorium (Th) or zirconium (Zr) is provided. The provided nuclear fuel is mixed with the Th or Zr, thereby creating a mixture. The mixture is then heated to a temperature sufficient to reduce at least some of the $UO_2$ in the nuclear fuel, preferably to at least to 850° C. for Th and up to 600° C. for Zr. Rare-earth metals or oxides, preferably Sm, Gd, Nd, Eu, are then extracted to form the heated mixture thereby producing a treated nuclear fuel. The treated nuclear fuel comprises the provided nuclear fuel having a significant reduction in rare-earth metals.

Figure 1:
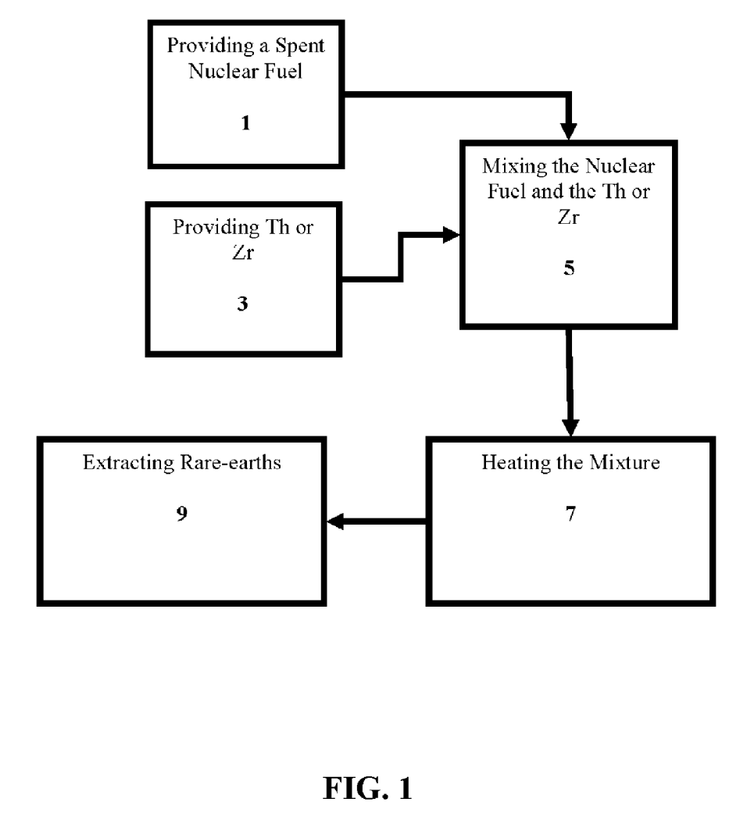
FIG. 1 depicts a flow diagram of one embodiment of a method for the separation of the rare-earth fission product poisons.

FIG. 1

FIG. 1 depicts a flow diagram of one embodiment of a dry recycle of nuclear fuel-separation of the rare-earth fission product poisons. This embodiment comprises the steps of providing a spent nuclear fuel 1 and providing Th or Zr 3; then mixing the provided nuclear fuel and the provided Th or Zr into a mixture 5; then heating the mixture 7; and extracting rare-earth metals after heating the mixture 9.

Providing Spent Nuclear Fuel 1

The step of providing spent nuclear fuel 1 comprises providing a spent nuclear fuel comprising $UO_2$ and rare-earth oxides (preferably Sm, Gd, Nd, Eu oxides), preferably from having gone through fission in a nuclear reactor, that contains fission product poisons. The spent nuclear fuel is preferably a uranium oxide, carbide, nitride, or hydride fuel. In a preferred embodiment, the spent nuclear fuel is a commercial LWR (light-water-reactor) oxide fuel. Preferably, the nuclear fuel is converted into a fine powder, less than 400 mesh or, less than 40 μm diameter particles. In one embodiment, mechanical sizing, such as ball milling is performed on the nuclear fuel. The specific optimal size is preferably determined through experimentation.

The provided nuclear fuel is preferably formed into a powdered nuclear fuel by subjecting the nuclear fuel to one or more oxidation-reduction cycles. If the provided nuclear fuel has a cladding, preferably, the cladding is breached by, for example, puncturing the cladding and then subjected to one or more oxidation-reduction cycles. Each oxidation-reduction cycle comprises oxidizing the provided nuclear fuel followed by reducing the provided nuclear fuel. Oxidizing the provided nuclear fuel forms $U_3O_8$, preferably at a temperature between 200-800° C., more preferably 400° C., which swells the nuclear fuel and ruptures the assembly clad. Preferably the provided nuclear fuel is reduced in $H_2$, whereby the provided nuclear fuel reverts back to $UO_2$ in $H_2$, preferably between 350 and 800° C., more preferably 600° C. The provided nuclear fuel is preferably subjected to a plurality of, preferably up to three, oxidation-reduction cycles, causing the nuclear fuel to swell and rupture any cladding and to pulverize the fuel to a desirable particle size suitable for pelletization, sintering and refabrication. Preferably, the nuclear fuel is pulverized using the oxidation-reduction cycle until the provided nuclear fuel is formed into a fine powder less than 400 mesh (40 μm). In the alternative, the cladding is mechanically ruptured and the provided nuclear fuel is then crushed and milled.

Providing Th or Zr 3

An element or compound comprising Th or Zr is provided, preferably in metal form, preferably Th or Zr. In alternate embodiments, any compound comprising Th or Zr may be used. In one embodiment, ThO is used and will oxidize up to $ThO_2$ while reducing $UO_2$ and rare-earth oxides to metals as discussed herein. In one embodiment, Th or Zr is Th metal (Th). Th can add additional positive reactivity to nuclear fuel during irradiation in a nuclear reactor. Th is a threshold fissionable nuclide, but can breed U-233 during fission, a fissile nuclide that can further add more positive reactivity to the nuclear fuel. The addition of Th (Th-232) will act much like the U-238 already in the nuclear fuel. Th refers to not just Th metal, but any form of Th or compound containing Th. Likewise, Zr refers to not just Zr metal, but any form of Zr or compound containing Zr.

In an alternative embodiment, Th or Zr is Zr metal (Zr). Zr is not fissionable, however it has a low parasitic thermal neutron capture cross section and is not affected the nuclear reactor reactivity.

Preferably, the Th or Zr is converted into a fine powder, less than 400 mesh, or less than 40 μm diameter particles. In one embodiment, mechanical sizing, such as ball milling is performed on the Th or Zr. The specific optimal size is preferably determined through experimentation. Preferably, the Th or Zr has a particle size similar, or more preferably substantially the same as, the particle size of the provided nuclear fuel.

Mixing Nuclear Fuel and Th or Zr into a Mixture 7

The provided spent nuclear fuel is mixed with Th or Zr using any means to substantially intermix either the Th or Zr with the provided nuclear fuel forming a physical combination. The Th or Zr and the provided nuclear fuel retain their identities and physically are mixed in the form of powders. Preferably, the provided nuclear fuel is mixed with Th or Zr using a mix tank comprising an agitator/blade within a container thereby physically mixing the provided nuclear fuel and the Th or Zr. Preferably, the provided nuclear fuel is mixed with Th or Zr using an agitator/blade deposited within the mixture that is rotated via an electronic motor, or in an alternate embodiment, a magnetic stirrer is employed. One embodiment of a magnetic stirrer comprises the use of a rotating magnetic field to cause a stir bar (or flea) immersed in the mixture to spin, whereby the mixture is mixed. Preferably, the rotating field is created by a rotating magnet or a set of stationary electromagnets. In an alternative mixer, a tumbler is utilized or other standard handbook mixing techniques can be applied.

When Th powder is mixed with the powdered provided nuclear fuel, a stoichiometric excess of Th is preferably added, preferably to approximately 10% excess.

When Zr powder is mixed with the powdered provided nuclear fuel, a stoichiometric excess of Zr is preferably added, preferably to approximately 10% excess, and the $UO_2$ and any $PuO_2$ are preferably reduced at temperatures up to 600° C., which releases the rare-earth oxides out of the uranium phase.

Heating the Mixture 7

The mixture is heated to a temperature sufficient to reduce at least some of the $UO_2$ in the nuclear fuel, preferably to at least to 850° C. for Th and up to 600° C. for Zr. At above 850° C. rare-earth (RE) oxides in the nuclear fuel will reduce in the presence of Th in the following Reaction 1:

$$(RE)_2O_3 + 3/2Th \rightarrow 3/2ThO_2 + 2RE \qquad \text{(Reaction 1)}$$

In other embodiments, rare-earth carbides and nitrides can also be reduced to metals by Th or Zr. Alternatively, these other nuclear fuel types can initially be oxidized and can be processed similarly to oxide fuel.

Preferably, Reaction 1 occurs simultaneously with the vaporization of the rare-earth metals. As a result, the rare-earth metals evaporate from the nuclear fuel.

Preferably, for embodiments using Th, the mixed nuclear fuel and Th is heated to at least 850° C. in a vacuum, an inert gas, a reducing fluid, or a combination thereof. In one embodiment, the reducing fluid is $H_2$. Two of the major rare-earth neutron-poison metals (Sm and Eu) will reduce and vaporize in the mixture at temperatures at or above 850° C. Preferably, the mixture is heated to a temperature at or above 1,500-1,800° C., the temperature needed to reduce and also vaporize Gd, and Nd. Preferably, the process is optimized by experimentation to maximize the extraction of Sm, Gd, Nd, and Eu from the nuclear fuel, as these rare-earth metals represent more than 98% of the negative reactivity due to rare-earth fission products and more than 73% of total negative reactivity following oxidative treatment.

In an alternative embodiment, the mixture of nuclear fuel and Zr is heated to approximately 600° C. At temperatures up to 600° C., Zr reduces $UO_2$ and $PuO_2$, which would segregate the rare-earth oxides from the uranium. In one embodiment, the resulting mixture of rare-earth oxide and $ZrO_2$ powders would be mechanically separated from the U and Pu by air classification. In another embodiment, the mixture would be heated to a temperature sufficient to cause the $ZrO_2$ to oxidize the U, but not Pu, preferably a temperature greater than 600° C. Preferably, the segregated rare-earth oxides, and rhodium metal (Rh), Zr, and Pu metals are chlorinated for vaporizing or dissolving from the $UO_2$.

In any of the embodiments for Th or Zr, once the rare-earth metals and possibly Rh have been separated from the fuel, if the uranium and plutonium are in the form of metals, they are preferably oxidized to $UO_2$ and $PuO_2$.

Extracting Rare-Earth Metals 9

For embodiments using Th, when the mixture is heated, rare-earth oxides in the mixture are reduced (using Reaction 1) and are vaporized. The vaporized rare-earth metals are cooled, forming rare-earth deposits. The rare-earth deposits are then collected. Preferably, the cooled rare-earth deposits are collected as a general maintenance, and recycled for use elsewhere or disposed as low-level waste.

Preferably, a surface within the container is designed specifically for collection of the cooled rare-earth deposits, for example a metal bar or block. Therefore, the metal bar or block is preferably removed from the container for cleaning of the cooled rare-earth deposits. In an alternate embodiment, the rare-earth metals collect on the surface of a container, which is periodically cleaned. In yet another alternate embodiment, the rare-earth deposits are extracted as vaporized rare-earth metals through one or more openings of a container. In this embodiment, the collected vaporized rare-earth metals are cooled and deposited outside the container.

Some of the rare-earth metals are vaporized. Preferably, the vaporized rare-earth metals are cooled on a surface, forming rare-earth deposits. The cooled rare-earth deposits are then collected. Additional methods may be used to separate the segregated rare-earth metals from the uranium and plutonium. These include air classification of the powders, selective chlorination, etc. The air classification may be preferred in some embodiments as it may also remove the Th from the mixture, thereby increasing the resulting efficiency of the treated nuclear fuel.

Following the reduction and segregation of the fuel components by Th, forming $ThO_2$, the particle size and density differences allow for the thorium and the rare-earth metals to be separated from the uranium and plutonium by air classification, preferably in a manner similar to what was developed for separating TRISO and BISO fuel particles from graphite fuels. The relative properties of those particles were, for TRISO and BISO, respectively, mean diameter 548 μm and 525 μm; particle density 2.26 and kernel density 9.60 g/cm$^3$. The theoretical densities of the treated spent nuclear fuel components are Th—11.7; $ThO_2$—9.86; U—19.05; Gd 7.90; Nd 7.00; Eu 5.24; Sm 7.52; Rh 12.4 in grams/cm3.

For embodiments using Zr, when the mixture is heated, the rare-earth oxides and the oxidized zirconium are preferably mechanically separated from the uranium and any plutonium by air classification. In another embodiment, the uranium is re-oxidized to $UO_2$ by heating it in the presence of the oxidized Zr to greater than 600° C. where thermodynamics favors this reversed process; Pu is not oxidized. Then, the rare-earth oxides and Pu metal as well as Rh and the now Zr are preferably selectively chlorinated for vaporizing from the $UO_2$.

Once segregated from the uranium, other chemical or physical processes can be used to extract the rare-earths (rare-earth metals, oxides and combinations thereof) from uranium. When both the uranium and the rare-earths are reduced to the metals, rare-earth metals are preferably converted to chlorides by exposure to chlorine gas, preferably at elevated temperatures. Because the rare-earth metals will likely be much finer, they may kinetically react under conditions of chlorine partial pressure and temperature where the uranium may not appreciably react. Once formed, the rare-earth chlorides are preferably extracted from the uranium by increasing the temperature in order to create a significant vapor pressure of the rare-earth chlorides where they can be swept away from the uranium in a carrier gas or in vacuum, preferably greater than 750° C.

In a preferred embodiment, the heated mixture is exposed to a chlorine gas at a temperature and pressure capable of converting said uranium, rhodium, and rare-earth metals of said heated mixture to uranium chloride, rhodium chloride, and rare-earth chlorides. The rhodium chloride and rare-earth chlorides are then heated to a temperature capable of creating a significant vapor pressure of the rhodium chloride and rare-earth chlorides. The heated rhodium chloride and rare-earth chlorides are then extracted using a carrier gas or in vacuum and preferably fractional vaporization and/or condensation to segregate the rhodium chloride and rare-earth chlorides from uranium chloride. In fractional vaporization, the system is heated and held at a series of various temperatures to effect vaporization of the more volatile chlorides at lower temperatures and the less volatile chlorides at higher temperatures to result in separations as they are recovered by condensation from each temperature fraction. In fractional condensation, the vapor species are collected in a series of condensation regions from higher to lower temperatures to collect, successively, less volatile to more volatile vapors, thereby effecting separations.

In an alternate embodiment, once the phase segregation has occurred, the system is preferably oxidized back to the oxides by heating in air or oxygen at a temperature sufficient to effect oxidation of uranium, thorium and rare-earths and then the rare-earth oxides and rhodium chlorinated. Preferably, the heating does not exceed 750° C. as the $UO_2$ and $ThO_2$ will not react with $Cl_2$ (g) to form volatile chlorides at moderate temperatures up to 750° C. The rare-earth oxides and rhodium will form chlorides, which are preferably volatilized at higher temperatures once $Cl_2$ is removed so that $UO_2$ will not react or in the alternative is dissolved in water to effect extraction. A substantial benefit of chlorination is that rhodium forms a volatile chloride and is preferably subsequently extracted. Rhodium contributes 11.8% of the total initial negative reactivity in SNF, compared with 22.8%, 13.2%, 12.7% and 4.6% for Sm, Gd, Nd, and Eu, respectively.

In one embodiment, the segregated rare-earth metals that result from reduction of the oxides are dissolved with nitric acid ($HNO_3$) that is not sufficiently concentrated to react with U. Uranium metal requires concentrated nitric acid, for example 6 to 10 molar $HNO_3$ at elevated temperatures, near boiling, for rapid dissolution. The rare-earth metals are electropositive and dissolve slowly in cold water and quite rapidly in hot water to form the hydroxides. The precipitated hydroxides, in turn, may be dissolved in nitric acid. Preferably experimentation will establish optimum conditions for extracting the rare-earth metals by the use of nitric acid. Alternatively, other acids, such as hydrochloric or sulfuric acid may effect selective dissolution of the Rare-earth metals. Once dissolved, the uranium may be separated from the solution of rare-earths by standard solid-liquid separations methods such as filtration or centrifugation.

Treated Nuclear Fuel

Preferably, the resulting treated nuclear fuel, after rare-earths and possibly Rh have been extracted, is enriched by adding fresh enriched uranium oxide feed material. The removal of the rare-earth elements and possibly Rh, negative reactivity fission products, will significantly reduce the amount of fresh enriched uranium oxide feed material required. If any amount of Zr reductant remains in the mixture, there will be negligible reactivity effect. If Th reductant remains in the mixture, Th will initially add negative reactivity to the fuel, the magnitude being directly proportional to the Th concentration. In a reactor, the Th is converted into fissile U-233 and over time the negative Th reactivity turns to positive U-233 reactivity. Even if the Th reductant remains at full concentration, the $UO_2+ThO_2$ mixture is still a useful nuclear fuel and more reactive than a pure $ThO_2$ composition and is preferably used in an advanced light water reactor (LWR) fuel, preferably to breed additional fissile U-233 fuel for increased fuel burn-up and nuclear fuel cycle length, minimize plutonium production related to proliferation concerns, and minimize fuel pin power peaking in LWR fuel assemblies. The $UO_2+ThO_2$ fuel mixture proportions are preferably adjusted for desired assembly reactivity requirements.

The treated nuclear fuel, after oxidation if necessary, now having reduced amounts of rare-earths is preferably mixed with fresh enriched uranium oxide feed material for eventual reintroduction into a fission reactor. The fresh enriched uranium oxide feed material preferably has a 25-30% volume fraction of 17 weight percent enriched U-235 feed. Preferably, the treated nuclear fuel is enriched by adding fresh enriched uranium oxide feed material not exceeding 17, more preferably 8, weight percent of U-235. Preferably, the treated nuclear fuel with removed fission product rare-earth poisons is mixed with a fresh $UO_2$ feed having 20-25% volume fraction of 6-8 weight percent enriched U-235 in $UO_2$.

Any residual Zr in the treated nuclear fuel will have no detrimental reactivity effect, as Zr is neutronically inert in a fission reactor. Elimination of the Zr would however allow for a slightly higher $UO_2$ nuclear fuel density.

Preferably, any residual Th added to the mixture is removed. If the Th cannot be removed, the $UO_2+ThO_2$ mixture is preferably used as a significantly more reactive fuel composition over $ThO_2$. In this embodiment, the treated nuclear fuel with Th is used in an advanced light water fission reactor fuel design in order to reduce peripheral fission pin power peaking in a fuel assembly and to breed additional fissile U-233 fuel for increased fuel burn-up.

Figure 2:
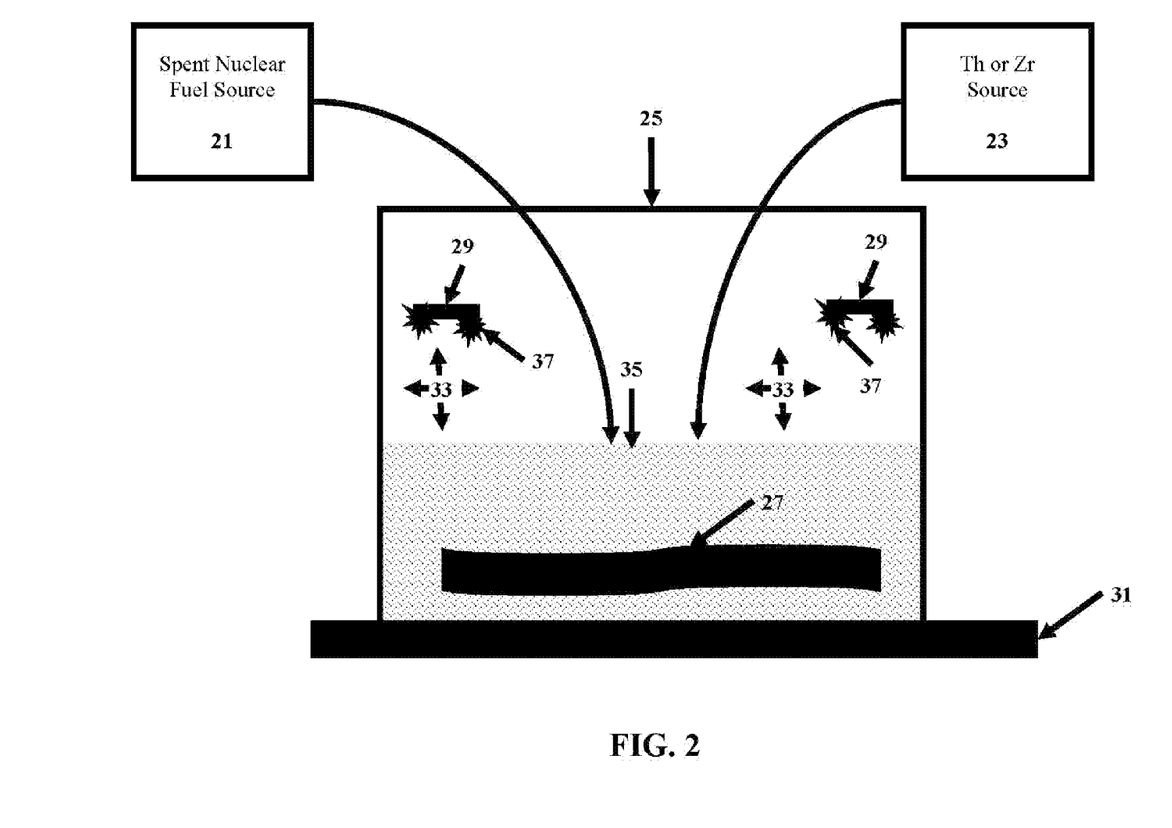
FIG. 2 depicts one embodiment of an apparatus for the separation of the rare-earth fission product poisons.

FIG. 2

FIG. 2 depicts one embodiment of an apparatus for the separation of the rare-earth fission product poisons comprising an oxidized nuclear fuel source 21, a Th or Zr source 23, a container 25, a mixer 27, a rare-earth deposit collector 29, and a heater 31. The nuclear fuel source 21 provides oxidized nuclear fuel. The Th or Zr source 23 provides Th or Zr, but not both.

The nuclear fuel from the nuclear fuel source 21 and the Th or Zr from the Th or Zr source 23 are supplied to the interior 33 of the container 25. The mixer 27 mixes the oxidized nuclear fuel and Th or Zr a mixture 35, as described above. The heater 31 heats the mixture 35. After the mixture 35 with Th is heated by the heater 31, rare-earth metals deposits from reaction with Th 37 will collect on the surface of the rare-earth deposit collector 29. After the mixture 35 with Zr is heated by the heater 31, several different options can be employed to separate the segregated rare-earth oxides from the uranium, such as air classification or heating above 600° C. to convert U back to $UO_2$ and chlorinating the rare-earth oxides, and Rh metal, and Zr for vaporizing from $UO_2$.

Spent Nuclear Fuel Source 21

The nuclear fuel source 21 provides spent nuclear fuel as described above. Preferably, the nuclear fuel cladding is breached and the exposed nuclear fuel is subjected to one or more oxidation and reduction steps, as described above, designed to produce a fine powder of 400 mesh (40 μm) or less and maximize the formation of $UO_2$. Alternatively, an oxide fuel separated from the cladding is converted to a fine powder by ball milling, as described above. The nuclear fuel, preferably as a fine powder, is then delivered to the interior 33 of the container 25 via various means. In one embodiment, the nuclear fuel is delivered to the interior 33 of the container 25 via one or more conveyer belts, pumps, pressure pumps, through the use of gravity, or a combination thereof.

Th or Zr Source 23

The Th or Zr source 23 provides Th or Zr as described above. In a preferred embodiment, the Th or Zr source 23 provides Th. In an alternate embodiment, the Th or Zr source 23 provides Zr. Preferably, the Th or Zr provided by the Th or Zr source 23 is delivered to the interior 33 of the container 25 via various means. In one embodiment, the Th or Zr is delivered to the interior 33 of the container 25 via one or more conveyer belts, pumps, pressure pumps, through the use of gravity, or a combination thereof.

Container 25

The container 25 is any container capable of containing the mixture 35 at the various temperatures during operation. Preferably, the container 25 is a metal or ceramic container. In a preferred embodiment, the container 25 is a high temperature ceramic material, such as alumina, that is suitable for chlorination and subsequent heating to at least 1,800° C.

Preferably, the container 25 is sealed to prevent gases from escaping, for example rare-earth metals. In an alternate embodiment, gases are allowed to escape out of the container 25, and are processed, for example cooled, at a different location.

Mixer 27

The mixer 27 is any means of mixing the mixture 35. For simplicity and clarity, only a single bar is depicted in FIG. 2 as the mixer 27, however the mixer 27 may further comprise other various components, for example motors, magnets, gears, rods, etc. Preferably, the mixer 27 is an agitator/blade deposited within the mixture 35 that is rotated via an electric motor. In an alternate embodiment, a magnetic stirrer is employed. One embodiment of a magnetic stirrer comprises the use of a rotating magnetic field to cause a stir bar (or flea) immersed in the mixture 35 to spin, whereby the mixture 35 is mixed. Preferably, the rotating field is created by a rotating magnet or a set of stationary electromagnets. In an alternative mixer, a tumbler is utilized. In one embodiment, once mixed, the mixture is transferred to a furnace, separate from the mixer for heating. In a preferred embodiment, the mixer 27 and heater 31 both utilize a rotating kiln for both mixing and heating.

Rare-earth Deposit Collector 29

The rare-earth deposit collector 29 collects rare-earth deposits. Although the rare-earth deposit collector 29 is depicted as a bar in FIG. 2 for simplicity, it may comprise one or more additional components. In a preferred embodiment, the rare-earth deposit collector 29 is a surface maintained at a temperature less than the vaporized Rare-earth metals, cool enough to allow rare-earth metals to cool and deposit on the rare-earth deposit collector 29. Preferably, the surface is air-cooled; however various passive and active cooling means may be employed. For example, in one embodiment, the surface is cooled by one or more fans, heat pumps, or cooling fluids. In an alternate embodiment, the rare-earth deposit collector 29 comprises a means of pumping the vaporized rare-earth metals out of the container 25 for further processing.

Heater 31

The heater 31 heats the mixture 35 within the container 25. Preferably, the heater 31 generates heat through combustion of fuels, lasers, passing of an electrical current through a resistive load, particle bombardment, heat pumping from an external source (e.g. nuclear plant, processing plant, etc.), solar, etc.

Figure 3:
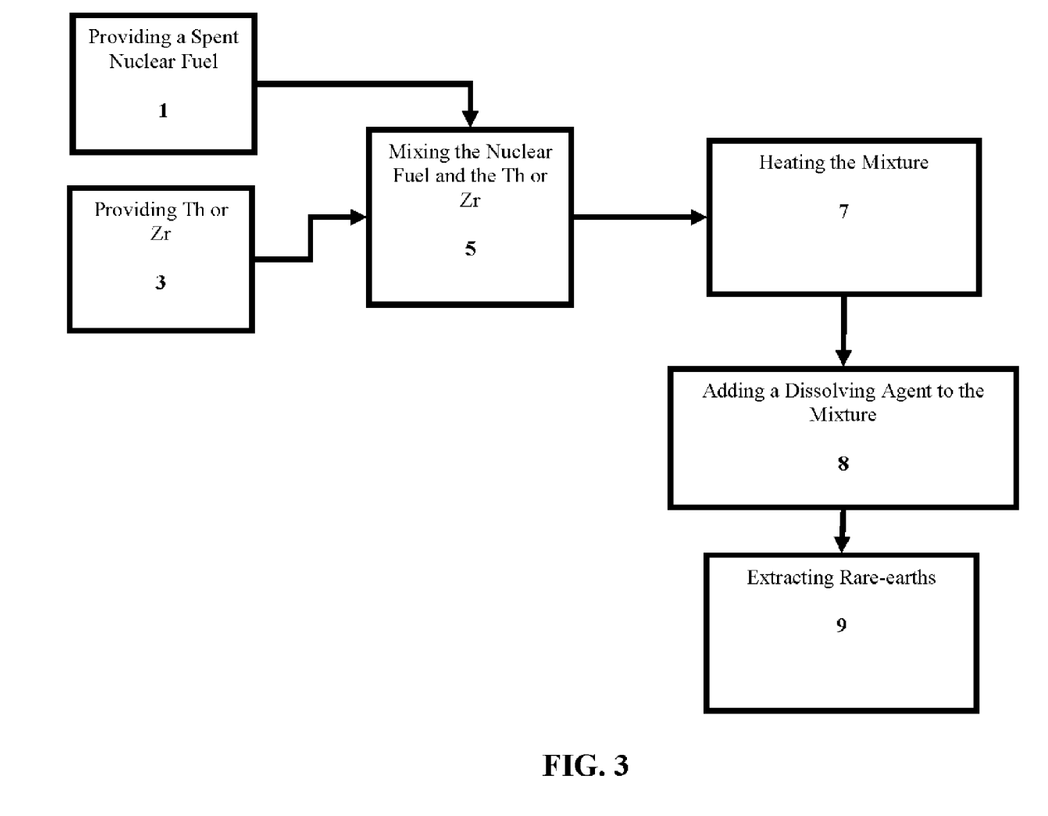
FIG. 3 depicts a flow diagram of one embodiment for the separation of the rare-earth fission product poisons comprising a dissolving agent.

FIG. 3

FIG. 3 depicts a flow diagram of one embodiment for the separation of the rare-earth fission product poisons comprising a dissolving agent. This embodiment comprises the steps described above in FIG. 1 including: providing a nuclear fuel 1; providing Th or Zr 3; mixing the nuclear fuel and the Th or Zr into a mixture 5; heating the mixture 7; and extracting rare-earths 9. This embodiment further comprises adding a dissolving agent to the mixture after the step of heating the mixture 7 of reacted nuclear fuel and Th 8. The mixture must first be heated 7 to allow reduction to proceed and segregate the fuel components prior to acid dissolution. The dissolving agent dissolves rare-earths without affecting the U, $UO_2$, $PuO_2$ or any $Th/ThO_2$ or $Zr/ZrO_2$ used. In one embodiment, the dissolving agent comprises dilute nitric acid. Once the dissolving agent dissolves the rare-earths the resulting solution is removed, preferably by decanting the solution (liquid) following gravity settling of solids. The resulting solution is preferably removed utilizing standard handbook solid-liquid separations techniques, such as centrifugation or filtration.

Example

In one exemplary embodiment, a 500 ton/yr processing plant is constructed to utilize four cylindrical furnaces of 2 ft diameter by 5 ft length are used to process nuclear fuel. Each cylindrical furnace preferably contains 114 kg BOL U (beginning-of-life initial uranium mass) of spent nuclear fuel; spent nuclear fuel from a pressurized light water reactor with 33 GWD/MTU (33 Gigawatt-days/metric tonne of initial uranium metal) exposure and cooled for 20 years. Operating 90% on-line for 292 days per year (80% operating days per year), each furnace preferably has a turnaround time of 5.75 hours. Therefore, if 4.0 hours is allowed for processing time and 1.75 hours for change out, the through-put rate is preferably achieved. At 1,000° C., the vapor pressures of Sm and Eu are 0.0027 and 0.017 atm, respectively. If a sweep gas rate of 210 standard liter/min (28-second residence time in furnace) is used and becomes saturated with rare-earth metal vapors, the mass transport rates of Sm and Eu would be 3.8 and 23 grams/minute, respectively. The fuel inventories would be 104 g Sm and 15.5 g Eu. Therefore, only a few minutes are preferably required to remove these two rare-earth metals. This calculation assumes that diffusion to the surface of the fuel particle is not rate limiting. For such a fast vaporization rate, one may need to allow for additional time for the diffusive removal.

In some cases, of Nd and Gd, the vapor pressures are not significant until the temperature is above 1,500° C. Similar removal calculations for Nd and Gd show that for a 4.0 hour operating period 19 and 8.8% of the Nd and Gd would be swept from the fuel at 1,500° C. At 1,600° C., the percentages would be 61 and 36% for Nd and Gd, respectively. At 1,800° C., the percentages would be 100% for both.

Vacuum removal is not limited by these considerations of saturation and sweep rate. With sufficient pumping speed, the rate is preferably determined by the diffusion/reduction processes. Therefore, it is preferable to reductively vaporize the Nd and Gd substantially at lower temperatures than would be required using a sweep gas.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. §112, 6. In particular, the use of "step of" in the claims herein is not intended to invoke the provisions of 35 U.S.C. §112, ¶6.

The embodiment of the invention in which an exclusive property or privilege is claimed is defined as follows:
1. A method for the separation of rare-earth fission product poisons from spent nuclear fuel comprising:
   a) providing a spent nuclear fuel comprising $UO_2$ and rare-earth oxides;
   b) said step of providing said nuclear fuel comprises providing a nuclear fuel and performing one or more oxidation-reduction cycles each cycle comprising:
     i. oxidizing said nuclear fuel; and
     ii. reducing said nuclear fuel;
   c) providing a compound comprising Th or Zr;
   d) mixing said provided nuclear fuel and said Th or Zr into a mixture;
   e) heating said mixture to a temperature sufficient to reduce said $UO_2$ of said provided nuclear fuel; and
   f) extracting rare-earth metals or oxides from said heated mixture thereby producing a treated nuclear fuel, whereby said treated nuclear fuel comprises said nuclear fuel with a significant reduction in rare-earths.
2. The method for the separation of rare-earth fission product poisons from spent nuclear fuel of claim 1 whereby said step of extracting rare-earth metals or oxides comprises extracting rare-earth metals or oxides from the group consisting of Sm, Gd, Nd, Eu, and combinations thereof metals or oxides thereof.

3. The method for the separation of rare-earth fission product poisons from spent nuclear fuel of claim 1 whereby:
    a) said step of mixing said provided nuclear fuel comprises mixing said provided nuclear fuel and Th into a mixture; and
    b) said step of heating said mixture comprises heating said mixture to a temperature sufficient to reduce both $UO_2$ and any rare-earth oxides.

4. The method for the separation of rare-earth fission product poisons from spent nuclear fuel of claim 1 further comprising:
    a) said step of mixing said provided nuclear fuel comprises mixing said provided nuclear fuel and Zr into a mixture; and
    b) said step of heating said mixture comprises heating said mixture to a temperature sufficient to reduce $UO_2$.

5. The method for the separation of rare-earth fission product poisons from spent nuclear fuel of claim 1 whereby said step of providing said nuclear fuel comprises:
    a) providing nuclear fuel;
    b) crushing said nuclear fuel into a powder; and
    c) oxidizing said nuclear fuel to a temperature between 200-800° C.

6. The method for the separation of rare-earth fission product poisons from spent nuclear fuel of claim 1 whereby said step of oxidizing said nuclear fuel comprises:
    a) oxidizing said nuclear fuel to a temperature of 400-600° C.

7. The method for the separation of rare-earth fission product poisons from spent nuclear fuel of claim 1 whereby said step of heating said mixture comprises:
    a) heating said mixture in a vacuum, heating said mixture in an inert gas, heating said mixture in a reducing fluid, or a combination thereof.

8. The method for the separation of rare-earth fission product poisons from spent nuclear fuel of claim 1 whereby said step for extracting rare-earth metals comprises vaporization, selective chlorination, air classification, or a combination thereof.

9. The method for the separation of rare-earth fission product poisons from spent nuclear fuel of claim 1 whereby said step of extracting rare-earth metals or oxides comprises:
    a) exposing said heated mixture to a chlorine gas at a temperature and pressure capable of converting said uranium to uranium chloride, rare-earth metals and oxides to rare-earth chlorides and rhodium metal to rhodium chloride;
    b) heating said rare-earth chlorides and rhodium chloride to a temperature capable of creating a significant vapor pressure of the rare-earth chlorides and rhodium chloride; and
    c) extracting said heated rare-earth chlorides and rhodium chloride using a carrier gas or in vacuum and fractional vaporization, whereby rare-earth chlorides and rhodium chloride are segregated from uranium chloride.

10. The method for the separation of rare-earth fission product poisons from spent nuclear fuel of claim 1 whereby said step of extracting rare-earth metals or oxides comprises:
    a) oxidizing said heated mixture, whereby oxides of uranium and thorium are formed; and
    b) exposing said oxidized heated mixture to temperature up to 750° C. and a pressure whereas the rare-earth oxides and rhodium form chlorides.

11. The method for the separation of the rare-earth fission product poisons from spent nuclear fuel of claim 1 further comprising:
    a) enriching said treated nuclear fuel comprising the steps of adding U-235, said treated nuclear fuel not exceeding 17 weight percent of U-235; and
    b) subjecting said enriched treated nuclear fuel to nuclear fission.

12. The method for the separation of the rare-earth fission product poisons from spent nuclear fuel of claim 1 further comprising:
    a) enriching said treated nuclear fuel comprising the steps of adding U-235, said treated nuclear fuel not exceeding 8 weight percent of U-235; and
    b) subjecting said enriched treated nuclear fuel to nuclear fission.

13. The method for the separation of the rare-earth fission product poisons from spent nuclear fuel of claim 1 whereby said step of mixing and heating further comprises:
    a) adding a dissolving agent to said heated mixture; and
    b) extracting said rare-earth metals with a dissolving agent.

14. The method for the separation of the rare-earth fission product poisons from spent nuclear fuel of claim 13 whereby said dissolving agent comprises nitric acid.

15. The method for the separation of the rare-earth fission product poisons from spent nuclear fuel of claim 1 whereby said step for extracting rare-earth metals comprises:
    a) vaporizing rare-earth metals during said step of heating said mixture; and
    b) collecting said vaporized rare-earth metals on a cooled surface, whereby said cooled surface has a temperature less than said mixture.

16. The method for the separation of the rare-earth fission product poisons from spent nuclear fuel of claim 2 whereby:
    a) said step of mixing said provided nuclear fuel comprises mixing said provided nuclear fuel and Th into a mixture;
    b) said step of heating said mixture comprises heating said mixture to a temperature above 850° C. and sufficient to reduce both $UO_2$ and any rare-earth oxides; and
    c) said step for extracting rare-earth metals comprises:
        i. vaporizing rare-earth metals during said step of heating said mixture; and
    d) collecting said vaporized rare-earth metals on a cooled surface, whereby said cooled surface has a temperature less than said heated mixture.

17. The method for the separation of the rare-earth fission product poisons from spent nuclear fuel of claim 16 whereby:
    a) said step of heating said mixture comprises heating said mixture in a vacuum, heating said mixture in an inert gas, heating said mixture in a reducing fluid, or a combination thereof;
    b) said step for extracting rare-earth metals comprises vaporization, selective chlorination, air classification, or a combination thereof;
    c) enriching said treated nuclear fuel comprising the steps of adding U-235, said treated nuclear fuel not exceeding 8 weight percent of U-235; and
    d) subjecting said enriched treated nuclear fuel to nuclear fission.

18. The method for the separation of the rare-earth fission product poisons from spent nuclear fuel of claim 2 further comprising:

a) said step of mixing said provided nuclear fuel comprises mixing said provided nuclear fuel and Zr into a mixture;
b) said step of heating said mixture comprises heating said mixture to a temperature less than 600° C. and sufficient to reduce $UO_2$; and
c) whereby said step of extracting rare-earth metals or oxides comprises:
   i. exposing said heated mixture to a chlorine gas at a temperature and pressure capable of converting said uranium and rare-earth metals of said heated mixture to uranium chloride and rare-earth chlorides;
   ii. heating said rare-earth chlorides to a temperature capable of creating a significant vapor pressure of the rare-earth chlorides; and
   iii. extracting said heated rare-earth chlorides using a carrier gas or in vacuum and fractional vaporization to segregate the rare-earth chlorides and rhodium chloride from uranium chloride.

19. The method for the separation of the rare-earth fission product poisons from spent nuclear fuel of claim 18 whereby:
a) said step of heating said mixture comprises heating said mixture in a vacuum, heating said mixture in an inert gas, heating said mixture in a reducing fluid, or a combination thereof;
b) said step for extracting rare-earth metals comprises vaporization, selective chlorination, air classification, or a combination thereof;
c) enriching said treated nuclear fuel comprising the steps of adding U-235, said treated nuclear fuel not exceeding 8 weight percent of U-235; and
d) subjecting said enriched treated nuclear fuel to nuclear fission.

* * * * *